E. T. SHELTON.
Tobacco-Knife.

No. 164,880. Patented June 22, 1875.

WITNESSES:

INVENTOR:
E. T. Shelton
BY
ATTORNEYS.

UNITED STATES PATENT OFFICE.

EDWARD T. SHELTON, OF LAUREL GROVE, VIRGINIA.

IMPROVEMENT IN TOBACCO-KNIVES.

Specification forming part of Letters Patent No. 164,880, dated June 22, 1875; application filed December 28, 1874.

*To all whom it may concern:*

Be it known that I, EDWARD T. SHELTON, of Laurel Grove, in the county of Pittsylvania, in the State of Virginia, have invented a new and Improved Tobacco-Knife; and I do hereby declare the following to be a full, clear, and exact description of the same, reference being had to the accompanying drawing forming a part of this specification, in which—

Figure 1:
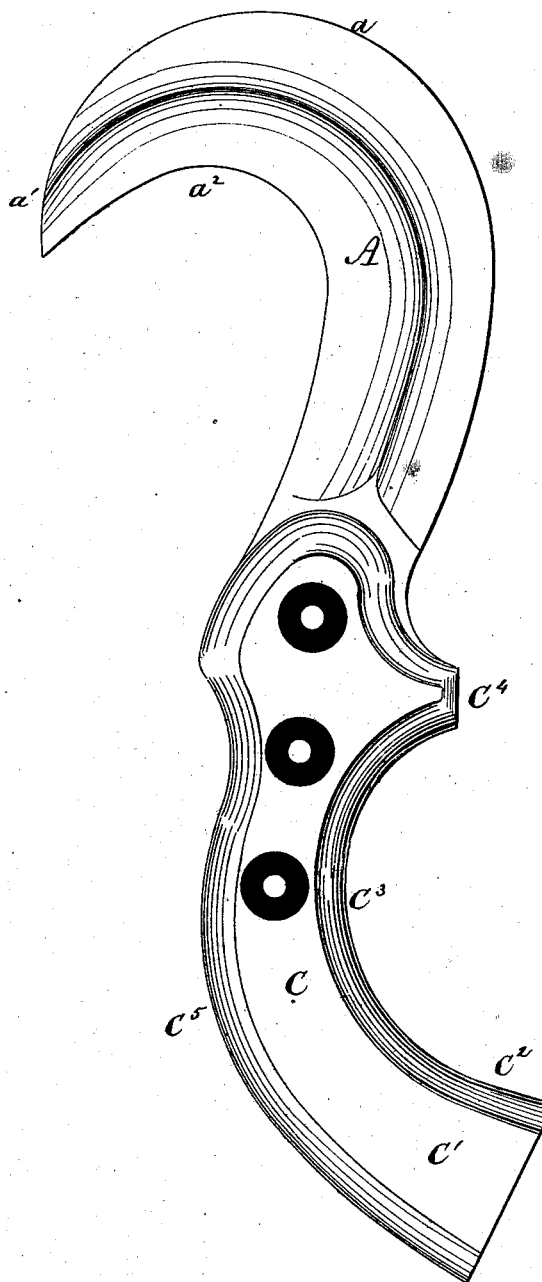
Figure 2:
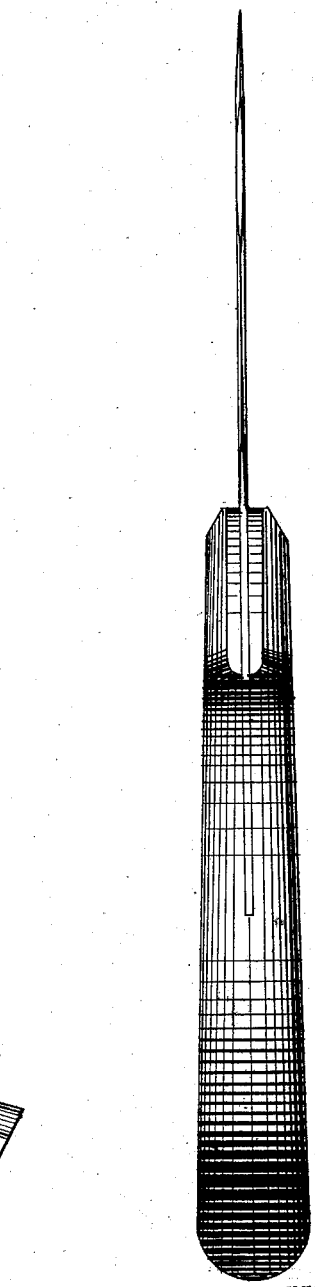

Figure 1 is a side, and Fig. 2 an end, elevation of my invention.

The invention relates to the knives, which are used in first splitting the previously-topped tobacco in the fields, nearly to the bottom, and then cutting it off, ready to be taken to the barn or tobacco-house. My invention consists in a curved handle and blade, the latter having an interior cutting-edge, and an exterior edge dulled near its end so as to avoid cutting the leaves as the stalk is being split down by a push-cut.

A represents the blade, which I make sharp on quite a gradual curve, $a$, while the edge of the end of this outer edge is turned round and is broadened and blunt. The object of this construction is to enable the workman to place the edge $a$ diametrically across the cut at the top, bear down perpendicularly with some force, and split the stalk within a few inches of the point where it is to be cut off, while the edge $a^1$, being curved rapidly, will touch very slightly on the adjacent leaves, and being blunt will not cut them at all. On the inside is formed the curved or hook-edge $a^2$ with which the workman, by an upward draw-cut, severs the stalk a little below the terminal of the split which he has just made—the blunt edge $a^1$ on the end again preventing the leaves from being broken off or cut. This is all intended to be done without changing the position of the knife in the hand of the workman.

In order to give the greatest purchase and facility in operating the knife, I make the handle C with a turned end, $C^1$, which has the inner curve $C^2$, against which rest the fourth and fifth digits; also a bottom, $C^3$, on which is supported the middle digit, and a projection $C^4$ around which is wound the fore or second finger.

The curved convexity $C^5$ fits snugly into the palm of the hand, and the whole adapts the knife to make an easy push and draw cut. The projection $C^4$ may be dispensed with, but gives a more powerful grasp, and is an auxiliary of considerable value.

Having thus described my invention, what I claim as new, and desire to secure by Letters Patent, is—

A tobacco-knife, having the curved blade A, with push-cutting edge $a$, draw-cutting edge $a^2$, and intermediate blunt edge $a^1$, constructed and arranged as and for the purpose specified.

EDWARD T. SHELTON.

Witnesses:
ALFRED ANDERSON,
GRANVILLE M. VADIN.